United States Patent [19]

Cuomo et al.

[11] 3,852,796

[45] Dec. 3, 1974

[54] GaN SWITCHING AND MEMORY DEVICES AND METHODS THEREFOR

[75] Inventors: Jerome J. Cuomo, Bronx; Harold J. Hovel, Putnam Valley, both of N.Y.

[73] Assignee: International Business Machines Corporation, Armonk, N.Y.

[22] Filed: June 8, 1972

[21] Appl. No.: 260,861

[52] U.S. Cl. .......................... 357/16, 357/1, 357/57, 357/58, 357/64, 357/41

[51] Int. Cl. ...................... H03k 17/56, H03k 17/70

[58] Field of Search.... 317/235 AC, 235 AP, 234 V

[56] References Cited

UNITED STATES PATENTS

| | | | |
|---|---|---|---|
| 3,390,311 | 6/1968 | Aven et al. | 317/237 |
| 3,683,240 | 8/1972 | Pankove | 317/235 AD |

OTHER PUBLICATIONS

Moeller, Inorganic Chemistry (Wiley, New York, 1952) pp. 757–758, "The Boron Family, Nitrides."

Kosicki et al., "... GaN Thin Films...," J. Vac. Sci. and Tech., Vol. 6, 1969, pp. 593–596.

Hovel, "Switching & Memory..." Appl. Phys. Lett., Vol. 17, No. 4, Aug. 1970, pp. 141–143.

Hovel et al., "Switching and Memory...," J. Appl. Phys., Vol. 42, No. 12, Nov. 1971, pp. 5,076–5,083.

*Primary Examiner*—Rudolph V. Rolinec
*Assistant Examiner*—William D. Larkins
*Attorney, Agent, or Firm*—John A. Jordan

[57] ABSTRACT

A non-volatile bistable switch and memory device comprising a GaN-Si heterojunction. Switching between its high impedance state and low impedance state, and viceversa, may be effected in either a bipolar or unipolar mode. Impedance states are retained up to several months with zero power.

23 Claims, 7 Drawing Figures

GaN SWITCHING AND MEMORY DEVICES AND METHODS THEREFOR

BACKGROUND OF THE INVENTION

1. Field of the Invention

The present invention relates to semiconductor switching and memory devices, and methods therefor. More particularly, the present invention relates to GaN-Si bistable switching and memory devices which may be characterized as being of the heterojunction type, and to methods for fabricating such devices and integrating same with other GaN-Si devices.

2. Description of the Prior Art

Various effforts have been made to obtain small, fast, stable and relatively inexpensive memory and switching devices. Of particular interest, are devices that are reproducible, and integratable with existing semiconductor technologies. In addition, it is desirable that such devices exhibit the characteristic of being non-volatile, i.e., that they retain the memory feature without the need for any applied power.

The desirability of obtaining devices exhibiting such characteristics has led to an interest in studying various bistable electrical effects in a variety of single crystal, polycrystalline and amorphous materials. Such devices have, in the main, taken the form of bulk and homojunction arrangements. However, there have been a variety of problems incident to implementation of the homojunction switching and memory devices thus far obtained.

Efforts have also been directed towards studying heterojunction devices as possible switching and memory devices. One such heterojunction switch and memory device is disclosed in application Ser. No. 441,712, filed Feb. 11, 1974, in which a request for Defensive Publication has been filed, and which is assigned to the assignee of the present invention. In addition, the switching and memory characteristics of ZnSe-Ge heterojunctions, for example, have been described in the August 1970 issue of *Applied Physics Letters*, Vol. 17, No. 4, at pg. 141, in an article by H. J. Hovel entitled "Switching and Memory in ZnSe-Ge Heterojunctions." Likewise, the switching and memory characteristics of ZnSe-Ge heterojunctions have been described by H. J. Hovel et al in the November 1971 issue of *Journal of Applied Physics*, Vol. 42, No. 12, at pg. 5,076, in an article entitled "Switching and Memory Characteristics of ZnSe-Ge Heterojunctions." As stated in the above-cited applications, what were considered abnormal and undesirable impedance characteristics under a reverse bias breakdown condition in a ZnSe-Ge heterojunction were described by H. J. Hovel et al in an article entitled "The Electrical Characteristics of nZnSe-pGe Hetero-Diodes," appearing in the *International Journal of Electronics*, 1968, Vol. 25, No. 3, pgs. 201–218.

One of the difficulties with the ZnSe-Ge, as well as the ZnSe-GaAs, GaP-Ge and GaP-Si, disclosed in the above-mentioned switching and memory articles and applications, resides in the fact that they are not conveniently reproducible. In addition, these heterojunction devices are, in the main, fabricated using a closed-spaced chloride transport technique, wherein the grown ZnSe layer is greater in thickness than 0.5 microns, and the grown GaP layers are greater in thickness than 10 microns. The ZnSe and GaP layer thickness as produced by this process result generally in high switching voltages, undesirable in a bistable memory device. Moreover, the thicknesses of these layers are too large to utilize them as the dielectric for such devices as MIS (metal-insulator-semiconductor) capacitors or FET's (Field Effect Transistors).

Thus, because of the nature of the materials and the growth processes employed in the latter mentioned heterojunction switches, the switches are not readily integrable with the common devices used in present integrated circuit technology. In addition, the bistable switches themselves can only be operated in a "bipolar" mode, i.e., can only be switched between impedance states by bipolar pulses. Thus, such bistable switches do not exhibit all of the characteristics desired for contemporary computer device applications and, moreover, the devices are not conveniently reproducible and compatible with existing technology.

SUMMARY OF THE INVENTION

In accordance with the principles of the present invention, a non-volatile bistable switch and memory device is obtained by sputtering GaN onto a Si substrate, whereby a GaN-Si heterojunction switching and memory device is obtained which exhibits the characteristics of being switchable in either a bipolar or unipolar mode. The bistable heterojunction switch and memory device, in accordance with the present invention, operates in the temperature range of −200°C to +200°C, exhibits non-volatility and rapid switching speeds, and is readily and conveniently reproducible. In addition, integration is enhanced by the fact that selected ones of discrete GaN-Si devices may be used as a bistable switch, while others may be used as FET or MIS devices.

Nearly all the methods used to grow GaN by conventional vapor growth techniques have resulted in heavily doped, low resistivity GaN, unsuitable for use in a bistable switch, since the bistable switch requires a high resistivity region in the wider bandgap material in order to operate. GaN layers of moderately high resistivity, however, have been reported in an article entitled "Gallium Nitride Films" which appeared in the *Journal of the Electrochemical Society*, Vol. 118, page 1,200, July 1971 and an article entitled "Preparation and Structural Properties of GaN Thin Films" which appeared in *Journal of Vacuum Science and Technology*, Vol. 6, page 593, 1969. The first article reported that layers of GaN of $10^6$ ohm-cm. resistivity and several microns thickness could be grown on nSi substrates using a bromide-ammonia vapor growth process. No bistable device, however, was reported in these structures.

However, contrary to prior art arrangements, there is provided in accordance with the principles of the present invention a relatively thin high resistivity GaN layer, deposited upon a Si substrate employing sputtering techniques, to thereby obtain a non-volatile bistable switch and memory device. Such sputtering techniques have been described in the January issue of the *Applied Physics Letters*, Vol. 20, No. 2, (1972) in an article by H. J. Hovel and J. J. Cuomo, and have been set forth in Applicants' copending application Ser. No. 184,405, filed Sept. 28, 1971, and assigned to the assignee of the present invention. More importantly, however, is the fact that Applicants' have discovered that a non-volatile bistable switch and memory device exhibiting characteristics allowing operation in either a bipolar or unipolar mode, may be obtained by fabricating a high resistivity GaN layer on a Si substrate, and making an injecting or ohmic contact to said GaN.

It is, therefore, an object of the present invention to provide an improved bistable switch and memory device.

It is a further object of the present invention to provide a bistable switch and memory device which exhibits characteristics which allow both bipolar and unipolar switching.

It is yet a further object of the present invention to provide a non-volatile bistable switch and memory device which is fast, and which is readily reproducible and inexpensive to fabricate.

It is still a further object of the present invention to provide a non-volatile bistable switch and memory device which is readily and conveniently integrated with existing silicon technology.

It is yet still a further object of the present invention to provide, in addition to a non-volatile bistable switch and memory device made of GaN-Si, manners in which these two materials may readily be formed into other and different electrical component devices including MIS capacitors and FET transistors.

It is another object of the present invention to provide a non-volatile bistable switch and memory device which does not have to be "formed."

It is yet another object of the present invention to provide GaN-Si semiconductor devices, and methods for making same.

The foregoing and other objects, features and advantages of the invention will be apparent from the following more particular description of preferred embodiments of the invention, as illustrated in the accompanying drawings.

DETAILED DESCRIPTION OF THE DRAWINGS

Figure 1:
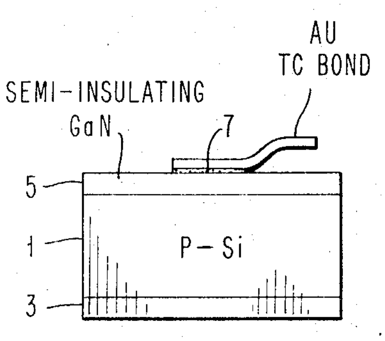
FIG. 1 shows the GaN-Si bistable switch and memory device, in accordance with the present invention.

The non-volatile bistable switch and memory device fabricated by forming a GaN-Si heterojunction, in accordance with the principles of the present invention, is shown a typical arrangement in FIG. 1. As shown, ohmic contact is made to the lower surface of Si substrate 1 via metal layer 3. Metal layer 3 may be formed on the substrate by any of a variety of conventional techniques. Typically, the Si substrate is a low resistivity P-type Si (e.g., $10^{-2}$ ohm/cm) and is doped to a level of $10^{18}$ impurity atoms $cm^{-3}$, or greater. However, these parameters may vary over a relatively wide range.

Formed on the upper surface of Si substrate 1 is layer 5 of GaN. The GaN is of high resistivity, or of relatively high resistivity. For purposes of explanation, the GaN layer has been characterized as semi-insulating. Typically, the GaN may have a resistivity ranging between $10^6$ to $10^{10}$ ohm-cm.

Injecting or ohmic contact is made to the GaN layer 5 by a gold thermo-compression bond, shown at 7 in FIG. 1. The high resistivity GaN layer 5 is deposited via sputtering, as will be described in more detail, hereinafter. However, it should be understood that although, at this time, the high resistivity layer of GaN is described as obtained by sputtering, it is quite clear that other techniques may be employed for obtaining the required GaN layer, to achieve the bistable switch and memory device in accordance with the present invention, as long as these techniques result in GaN layers of high resistivity and sufficient materials "defects" as will be hereinafter described.

Figure 2:
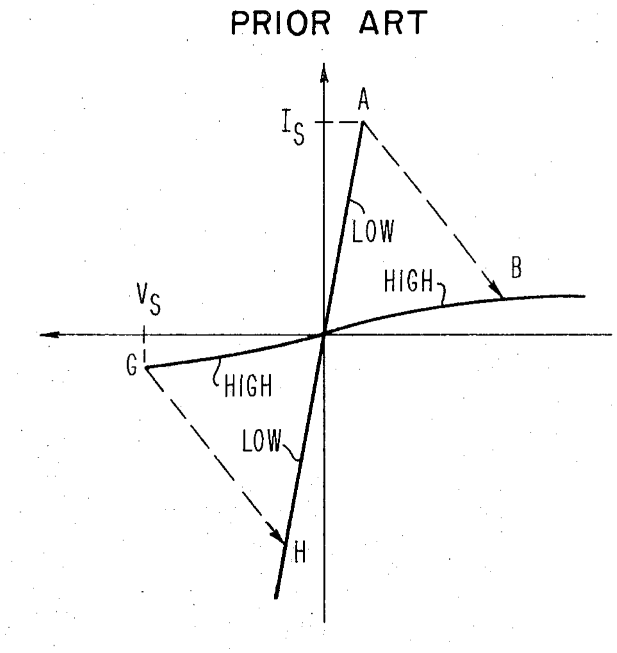
FIG. 2 PRIOR ART
FIG. 2 shows the V-I impedance characteristics of a prior art heterojunction bistable switch which may only be operated in a unipolar mode.

In FIG. 2, there is shown the typical V-I characteristics of known prior art heterojunction bistable switch and memory devices which only operate in the bipolar mode. This type of switching characteristic is typical of the heterojunction bistable switch and memory device, as described in the above-cited application Ser. No. 441,712. In accordance with such switching characteristics, a positive pulse of amplitude greater than current threshold $I_S$ may be employed to drive the switch from its low impedance state at A to its high impedance state at B. Thereafter, switching back to the low impedance state is achieved by applying a negative pulse in the high impedance state G, whereby the switching threshold voltage $V_S$ thereat is exceeded and the device switches back to the low impedance state H. Again, to switch the device to its high impedance state, a voltage of sufficient amplitude and polarity must be applied to the device to drive same to threshold $I_S$ in the first quadrant, whereby the device switches from A back to B.

Figure 3:
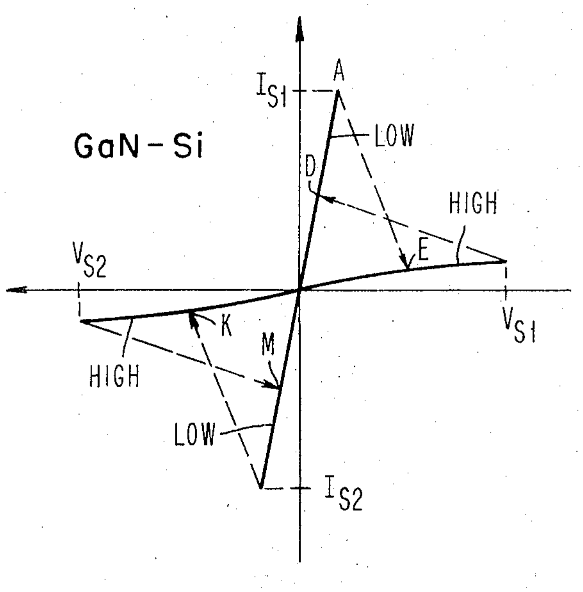
FIG. 3 shows the V-I impedance characteristics of the GaN-Si bistable switch and memory device, in accordance with the present invention, which device may be operated in either a unipolar or bipolar mode.

Contrary to the manner in which switching devices have the characteristics depicted in FIG. 2 operate, the GaN-Si heterojunction switch and memory device, in accordance with the present invention, operates according to the switching characteristics shown in FIG. 3. As shown in FIG. 3, the device of the present invention may operate in either a unipolar mode or bipolar mode. For example, the GaN-Si switch, as represented by the characteristics of FIG. 3, may be switched from its low impedance state D at threshold $I_{S1}$ to its high impedance state E, by the application of a positive pulse to the injecting contact on the GaN layer. Thereafter, the device may be switched from its high impedance state E at threshold $V_{S1}$ back to its low impedance state D by the application of another positive pulse to the injecting contact of the GaN layer. Likewise, the device may be switched from its high impedance state K at threshold $V_{S2}$ to its low impedance state M by the application of a negative pulse to the injecting contact. Thereafter, the device may be switched from its low impedance state M at threshold $I_{S2}$ back to its high impedance K by the application of another negative pulse to the injecting contact.

In addition to the unipolar mode described above, the GaN-Si switch, as represented by FIG. 3, may be operated in the bipolar mode, similar to the manner of FIG. 2 whereby switching from high impedance to low is performed with the opposite voltage polarity as switching from low impedance to high. For example, the device may be driven from its low impedance state D in the first quadrant to its high impedance state E in the first quadrant. Thereafter, the device may be driven to the opposite polarity whereby switching is effected from its high impedance state K to its low impedance state M. It should thus be clear that a combination of both bipolar and unipolar switching may be employed as desired. Accordingly, any path may be traversed along the characteristic lines shown in FIG. 3, and switching occurs in accordance with the orientation of the arrows, as shown at the ends of the dotted lines. In general, the transition from low impedance to high or high impedance to low in either the unipolar or bipolar mode of operation takes place in a period of less than 100 nanoseconds and perhaps less than 10 nanoseconds. The values of the low and high impedance states generally range from 40–1,000 ohms for the low state and 20K–20 Megohms for the high state.

It is generally desirable to use a different series ("load") resistance for the transitions from high resistance to low than for the transition from low resistance to high, in order to limit the maximum voltage and current applied to the device in the two states. For example, for the transitions from high impedance to low, E to D or K to M in FIG. 3, a load resistance of 1,000 ohms to 20,000 ohms is desirable to prevent the current in the low impedance state D or M from attaining excessive values (20 milliamperes or greater) which would cause the device performance to degrade. For the transition from low impedance to high, D to E or M to K in FIG. 3, a load resistance of 200 ohms or less is desirable to prevent the voltage across the device after switching into the high impedance state from exceeding the thresholds $V_{S1}$ or $V_{S2}$, resulting in oscillations and possibly device degradation.

It should be noted that the non-volatile characteristics of the GaN-Si switch and memory device of the present invention are such that the device, upon removal of all power thereto, will retain its impedance state existing at the time of power removal for up to several months. It should also be noted that the impedance characteristics of the device are such that it may be read either destructively or non-destructively, as described in the above-cited copending application.

There have been many electrical, thermal, and combinations of electrical and thermal mechanisms used to describe switching between different impedance states in solids. Many of these have been outlined in an article entitled "Thermal Effects on Switching of Solids from an Insulating to a Conducting State," which appeared in *Proceedings of the Institute of Electrical and Electronic Engineers*, Vol. 59, page 1,099, July 1971. Although an electrical-thermal mechanism may be partly the cause of the switching behavior in GaN-Si heterojunctions, and although the V-I characteristics of the GaN-Si switch as depicted in FIG. 3 differ from the heterojunction bistable switches depicted in FIG. 2 by their operability in both the bipolar and unipolar modes (due, possibly, to differences in the energy band diagram of the metal-GaN-Si heterojunction system compared to the other heterojunctions), there are many aspects and features of the non-volatile switching behavior of the GaN-Si device of the present invention which are similar to the heterojunction memory devices described in the above-cited articles and copending application by Hovel et al.

In particular, it appears that the switching mechanism is due, at least in part, to the presence of a high density of crystalline imperfections in the wider band gap GaN material, as described in application Ser. no. 441,712. More particularly, in accordance with the principles of the present invention, a heterojunction bistable switch and memory device is fabricated by depositing a high resistivity thin film of GaN on a low resistivity Si substrate in a manner that the grown layer exhibits crystalline defects including stacking faults, dislocations and traps, greater in density than the dopant density of the GaN. Typically, it appears that the crystalline defects, including deep energy traps, are greater than approximately $3 \times 10^{18}$ cm$^{-3}$.

Not only does it appear that a high density of crystalline defects must be present in the grown GaN layer, but in addition a high density of crystalline defects must be present at the GaN-Si interface. In this regard, it appears that it is by the nature of heterojunctions, themselves, that crystalline defects and material imperfections are readily obtained. In particular, GaN and Si have, in general, different properties; for example, crystalline lattice parameters, thermal expansion parameters and atomic bonding mechanisms, differ in the two materials. Accordingly, when the GaN thin film is grown upon the Si, a significant degree of naturally occurring crystalline defects and material imperfections occur.

It has been found, in accordance with the present invention, that these crystalline defects and material imperfections are sufficiently achieved when a high resistivity GaN is sputtered upon a Si substrate, in accordance with the techniques described in application Ser. No. 184,405, cited above. Typically, the high resistivity GaN is RF sputtered onto the Si substrate in a low pressure environment, using high purity nitrogen. The high purity nitrogen may be further purified by passage through a titanium sublimation pumping arrangement and, may be used to both sputter-clean the Si substrate surface before growth and to form the GaN. The titanium sublimation pumping arrangement may also be used to getter active species, such as oxygen and oxygen-bearing compounds, from the environment. Sputtering targets of 5–9's or 6–9's purity may be employed in a water-cooled cathode assembly. The Si substrate, which is in direct contact with the energetic nitrogen species, typically may be subjected to an RF driven bias, and maintained during the process at temperatures between room temperature and 800°C. GaN layers with resistivities of $10^6$ to $10^{10}$ and greater ohm/cm. may readily be achieved by this sputtering process.

Although a sputtering process has been described as one way by which the GaN layer might be grown upon the Si substrate to fabricate the GaN-Si bistable switch of the present invention, it is clear that other methods might be employed to grow the high resistivity GaN in the manner required to form the switch; some of the methods which could presumably be used are cited above. Although the complete mechanism by which the bistable device of the present invention switches in both unipolar and bipolar modes is not understood, it does appear that a high density of crystalline defects or material imperfections, comprising dislocations, vacancies, stacking faults and traps are required in the wider band gap grown layer and at the interface thereof, in order to achieve this bistable switching, and the non-volatile memory characteristics.

In particular, it appears that in order to achieve the bistable switching and non-volatile memory characteristics of the present invention, the device must contain a high density of crystal imperfections or material defects, and, more in particular, a high density or traps including double or more acceptor-like traps in eccess of $3 \times 10^{18}$ in the grown layer, and donor-like traps in excess of $1 \times 10^{19}$ near the interface. An acceptor-like trap is one which is negatively charged when filled with electrons and becomes less negatively charged or neutral when electrons are removed from it. A double or more acceptor-like trap is one which contains two or more electrons and retains one or more units of negative charge when one electron is removed from it. A donor-like trap is one which is in a neutral charge state in its equilibrium condition and becomes positively charged when one or more electrons are removed from it.

In addition to the trap densities, it appears that the resistivity of the grown layer must be relatively high. Furthermore, it appears that the substrate should typically be heavily doped (greater than $10^{17}$ $cm^{-3}$) and exhibit a relatively narrow band gap (e.g., approximately 1.4 eV or less). On the other hand, the grown layer, it appears, should exhibit a relatively wide band gap (greater than approximately 1.4 eV, for example). These energy-band gap guidelines generally insure that the energy-band diagram of the resulting heterojunction has the necessary energy barriers and magnitudes to result in bistable switching behavior.

Since it appears that the trap density in the grown layer must be greater than the doping density, and the high resistivity grown GaN layer of the present invention contains little doping, then the required trap densities are more readily achieved. However, it is not evident from what was known in the prior art that such high resistivity ($10^6$ to $10^{10}$ ohm/cm) GaN would be obtainable on Si in a manner to provide the bistable switching in non-volatile memory characteristics and operation, in accordance with the present invention. In addition to being capable of operation in a unipolar mode, the GaN-Si switch of the present invention exhibits a good impedance ratio, in addition to an improved reliability and reproducibility over previous bistable devices.

The GaN layer should be 0.5 micron or less in thickness in order to obtain switching voltages, which are proportional to the GaN thickness, of 10 volts or less. In particular, the thickness range of 500A–1,500A results in thresholds of around 3 volts, which is nearly ideal for memory devices of this type.

Figure 4:
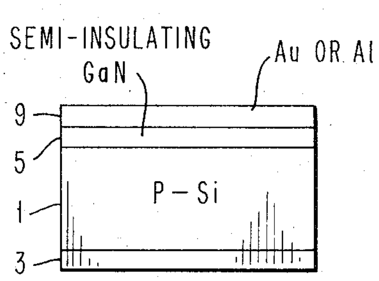
FIG. 4 shows a GaN-Si device having a layer of gold or aluminum over the GaN.

One of the more important advantages of using GaN with Si to form a bistable switch and memory device, resides in the fact that the device materials are readily adaptable to other electronic components, e.g., MIS and FET devices. As shown in FIG. 4, when a layer of gold or aluminum 9 is used to contact semi-insulating GaN layer 5, high impedance energy barriers result between the metal and GaN. Thus, the device as shown in FIG. 4 may readily be adapted for use as an MIS or FET device wherein the GaN acts as the insulating dielectric of said devices. In addition, it is clear that metal layer 9 can readily be adapted to form the field plate required for the gate electrode of a MIS or FET device.

As shown in FIG. 4, then, where a layer of metal such as gold or aluminum is deposited upon the GaN layer, normally a high energy barrier results between the metal and the GaN and, accordingly, the bistable impedance characteristics shown in FIG. 3 are not present initially due to the high impedance energy barrier. This is so due to the fact that before the device will act as a bistable switch, an injecting or ohmic contact must be made to the GaN layer. In the arrangement of FIG. 1, an injecting or ohmic contact was made to the GaN by creating a thermocompression bond to the GaN and, thereafter, employing a "forming" process whereby a relatively large voltage (for example, 50–100 volts) is applied to the gold electrode to transform the high impedance contact to an injecting or ohmic contact. With regard to the arrangement of FIG. 4, the metal layer forms a non-injecting contact with the GaN of extremely high impedance ($10^{12}$ ohms), which must be "formed" to transform it to an injecting or ohmic contact; it can withstand 50–100 volts, for example, without drawing any appreciable current through the GaN before the "forming" step is applied. Accordingly, although the device can be voltage "formed" to create the bistable switch of the present invention, it is clear that such is not a convenient means of achieving injecting or ohmic contacts due to the high voltages required.

As an alternative to the "forming" to achieve an injecting or ohmic contact, indium or indium alloys may be employed to reduce the high impedance at the metal GaN interface. In particular, indium may be employed to create a low resistivity contact to the high resistivity GaN layer. Several techniques will now be described for achieving this end.

Figure 5:
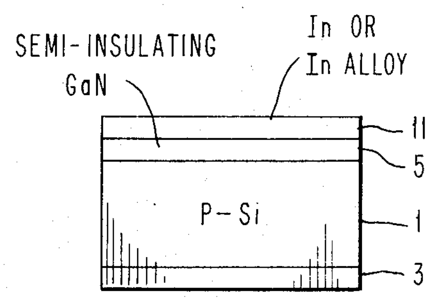
FIG. 5 shows a GaN-Si device, in accordance with the present invention, with the layer of GaN having deposited thereon a layer of indium or indium alloy for purposes of making and injecting or ohmic contact to the layer of GaN.

The first technique to be described, involves the evaporation of a relatively thin layer 11 of indium, or indium alloy, on the high resistivity layer of GaN, as shown in FIG. 5. One particularly effective technique involves the evaporation of xIn:(1−x)Al films, where $2/3 \leq x \leq 1$, and firing at temperatures from 500°C for at least 30 minutes to 650°C for at least 5 minutes. The indium in such an arrangement acts as low work function metal, to form the injecting contact to the high resistivity GaN layer 5, and the Al is present to prevent the indium from "balling up" when heated to the firing temperature. It is clear that the evaporation of In, In-Al, In-Au, In-Sn, or In-Si, as well as other mixed layers containing In, will act to provide a low resistance, i.e., injecting contact, to the high resistivity GaN. Thus, by using the In or In alloys, an ohmic or injecting contact to the GaN is achieved without voltage "forming".

Figure 6:
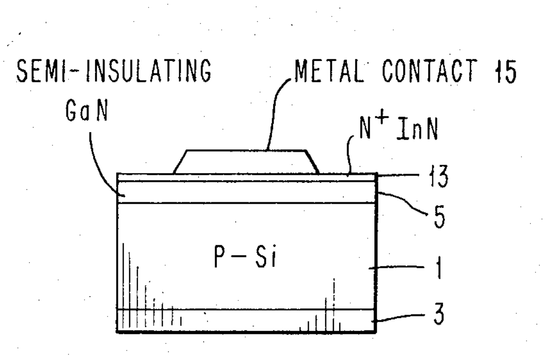
FIG. 6 shows a GaN-Si device, in accordance with the present invention, wherein a very thin layer of $n^+$InN is formed on the layer of GaN for purposes of making an injecting or ohmic contact to the layer of GaN.

Another technique for making an ohmic or injecting contact to the high resistivity GaN involves using a layer of InN as the low resistance contact surface. Such an arrangement is shown in FIG. 6. Typically, the thin layer 13 of InN may be deposited upon the layer 5 of GaN by sputtering. By sputtering, an $n^+$ conducting InN layer is formed on the GaN layer. Apparently, the $n^+$ InN layer acts to produce an ohmic contact directly to the GaN layer without any need for firing at some elevated temperature for a fixed period of time. It should be understood, however, that other methods may likewise be employed to deposit the low resistivity InN layer on the high resistivity GaN layer, in addition to the indicated sputtering technique.

As an alternative to the depositing of an $n^+$ InN layer on the GaN, diffusion techniques might likewise be employed to create an $n^+$ InN or mixed InN-GaN region within the original GaN layer. Thus, In may be diffused from a suitable source into the original GaN layer. By such diffusion process, an $n^+$ InN layer will be formed at the surface of the GaN, with this layer being followed by a thin layer of mixed InN and GaN, and the latter followed by the remaining GaN.

As another alternative to depositing an $n^+$ InN layer, it is possible to ion bombard the original layer of GaN with In, in the same manner as described in regard to diffusion. By ion bombarding or diffusing the layer of GaN with In, the surface of the GaN is conditioned (by forming the $n^+$ InN) so that an injecting or ohmic contact, via a layer of metal, can readily be made thereto. Such a metal contact is shown at 15 in FIG. 6, which metal contact may comprise, for example, a layer of Al or Au.

As final alternative techniques for making an injecting or ohmic contact to the GaN, it is possible to use layers of indium oxide (Sn doped). The indium oxide may be sputtered onto the GaN at temperatures from 25°C to 750°C. The indium oxide is transparent to light in the visible region, and is highly conducting. The behavior of the indium oxide is similar to that of the InN conducting layers, in that it establishes a low resistance contact surface whereby a metal injecting or ohmic contact may readily be made thereto. All of the above described techniques for making an injecting or ohmic contact eliminate the need for using a "forming" voltage.

Figure 7:
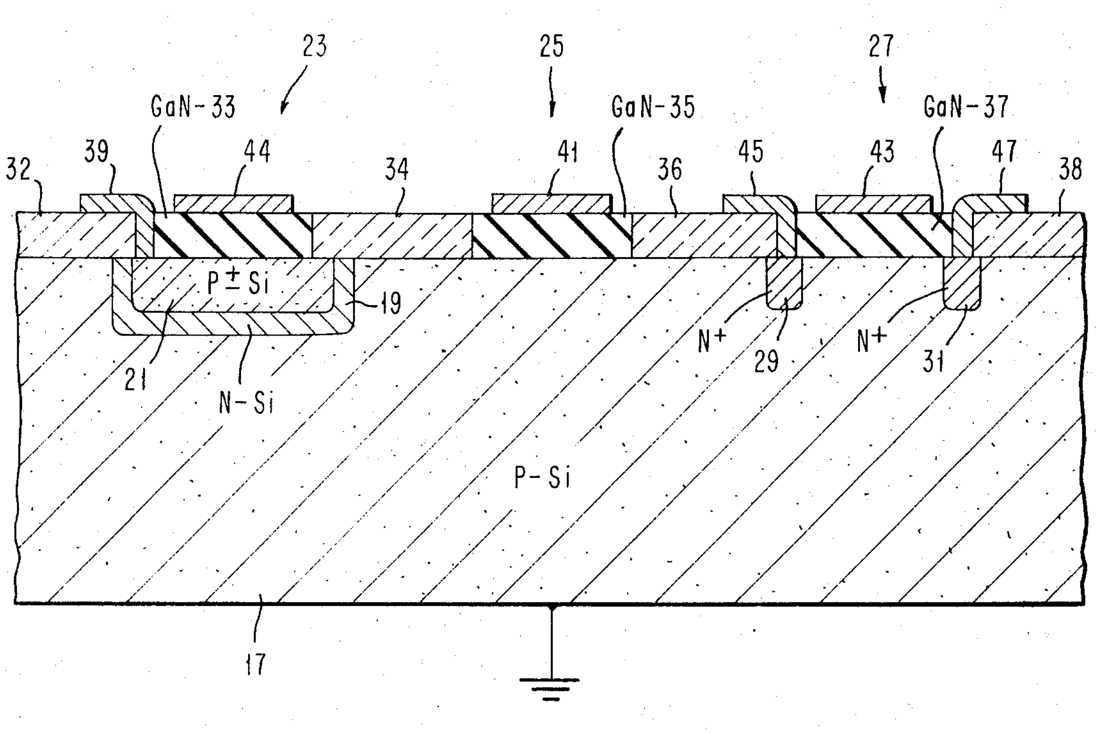
FIG. 7 depicts a typical representation of three different types of electronic components that may be integrated on a Si substrate utilizing the GaN and metal contact thereto.

In FIG. 7, there is shown a typical arrangement, for purposes of demonstrating the compatibility and integratability of the non-volatile bistable switch and memory device of the present invention with monolithic silicon technology. Silicon substrate 17 may be a P-type substrate of moderate resistivity, e.g., 10 ohm/cm. To form the bistable switch, in accordance with the present invention, an isolation barrier may first be fabricated to isolate silicon substrate 17 from the switch. This may readily be achieved by a diffusion process, whereby a relatively low resistivity n-type region 19 is diffused into the substrate. Thereafter, a highly doped, low resistivity p-type region 21 may be diffused within the n isolation region 19. This latter p region, it is clear, will act as the silicon substrate for the bistable switch, corresponding to silicon substrate 1, shown in the preceding FIGS.

As shown in FIG. 7, the switch is generally designated by 23. Other type electrical components are shown at 25 and 27, with 25 being typically an MIS capacitor and 27 being an FET device. Before or after the p region 21 is diffused, $n^+$ regions 29 and 31 of the FET device 27 may likewise be diffused. These latter regions may act as the source and drain regions for the FET device. After the diffusion steps, a layer of GaN may be deposited over the entire surface of the substrate. Thereafter, the GaN may be selectively etched to remove selected regions, and leave the particular region shown at 33, 35 and 37. As shown at 32, 34, 36 and 38 $SiO_2$ may be employed as the insulator to fill in between the retained regions of GaN. Alternately, since the GaN layer is insulating, the GaN layer may be left continuous except for the contact openings 39, 45 and 47. The GaN in between the devices remains inactive just as the $SiO_2$ would, if used as the insulator. Electrical contact is made with p region 21, via the metal conductor 39. Metal conductor 39 may be made of Al, Au, or other suitable metals. Likewise, metal plate 41 for MIS capacitor 25 and metal plate 43 for FET device 27 may be fabricated from Al or Au. So also may electrical contacts 45 and 47 to respective $n^+$ regions 29 and 31 be made of Al or Au.

As can be seen in FIG. 7, a single silicon substrate and a single layer of GaN have acted to provide the basic elements for three different type devices. Metal plates 41 and 43 act as a very high resistance contact to the GaN and, accordingly, are only capacitively coupled to the underlying substrate 17. Where plate 44, of bistable switch 23, is made of Al or Au, it likewise creates a high resistance contact to the underlying GaN 33. Thus, where Al or Au is employed for plate 44, element 23 might be employed as a capacitance device, with the capacitance existing between the plate 44 and electrical contact 39. On the other hand, if it were desired to transform this capacitance device into a non-volatile bistable switch and memory device, in accordance with the present invention, voltage "forming" could be employed to make contact 44 an injecting or ohmic contact.

It is clear, then, that where an array of devices such as 23 employ Al or Au for contact 44, these devices might be selectively transformed by voltage "forming" into bistable switches or memory devices, in accordance with the particular design requirements. Those not employed as bistable switches might be employed as other type elements. In addition, it can be seen that where an array of devices such as 23 are fabricated and particular "formed" bistable devices are used which fail under usage of the devices, new bistable devices might readily be produced to replace the failed devices by the voltage "forming" of additional devices not yet electrically connected.

It is, likewise, evident that rather than employ Al or Au for plate 44, an In or In alloy might also be used. As described above, where In is employed the need for voltage "forming" is obviated. It can be seen, then, that where a monolithic array of GaN on silicon is initially fabricated, that by the selective deposition of particular type metals, selected electrical devices may be created. Thus, where Al or Au is deposited as layer 44, as shown at 23 in FIG. 7, and "forming" is not applied, a capacitor-type device is created. When "forming" is applied, or where In, or an In alloy is deposited as layer 44, a non-volatile bistable switch and memory device is created, in accordance with the principles of the present invention. At the same time, the same GaN layer with Au or Al metallization produces the MIS capacitor 25 and the FET device 27.

It is obvious that many particular forms of Si monolithic processing including steps such as diffusion, growth of epitaxial layers, isolation between devices, passivation, and others might be used in various desired sequences to obtain various types of arrays. The essential feature here is that the same high resistivity GaN layer may be used in conjunction with such Si processing to obtain various types of active devices.

While the invention has been particularly shown and described with reference to preferred embodiments thereof, it will be understood by those skilled in the art that various changes in form and details may be made therein without departing from the spirit and scope of the invention.

What is claimed is:

1. A non-volatile memory, comprising:
a heterojunction device having a first region of crystalline silicon of one conductivity type; and
a second region of crystalline GaN forming a junction with said first region, said GaN containing a high density of material imperfections including deep energy traps existing at densities greater than approximately $10^{18}$ $cm^{-3}$ with said traps including double or more acceptor-like traps in the bulk of said GaN and donor-like traps in the vicinity of said junction so as to form a memory that exhibits a non-volatile high impedance state and a non-volatile low impedance state with both said high impedance state and said low impedance state being accessible in both a bipolar and unipolar mode; and
means for accessing said non-volatile high impedance state and non-volatile low impedance state, said means for accessing including means for applying unipolar voltage pulses to said device for accessing both said non-volatile high impedance state from said non-volatile low impedance state and said non-volatile low impedance state from said non-volatile high impedance state using said unipolar pulses.

2. The memory as set forth in claimm 1 wherein said GaN is sputtered GaN of high resistivity.

3. The memory as set forth in claim 1 wherein said GaN has a thickness of 500 angstroms to 10,000 angstroms.

4. The memory as set forth in claim 3 wherein said second region of GaN has an injecting contact thereto comprising In or In alloys.

5. A non-volatile switch and memory device, comprising:
a first region of relatively low resistivity silicon of one conductivity type;
a second region of GaN forming a junction with said first region, said second region of GaN containing a high density of material imperfections including deep energy traps existing at densities greater than approximately $10^{18}$ $cm^{-3}$ with said traps including double or more acceptor-like traps in the bulk of said GaN and donor-like traps in the vicinity of said junction so as to produce a device that exhibits a non-volatile high impedance state and a non-volatile low impedance state with both said high impedance state and said low impedance state being accessible in both a bipolar and unipolar mode; and
means to apply energy to access either one of the said impedance states of said device, said means to apply energy including means to apply unipolar voltage pulses to said device for reversibly switching from either one of said states to the other using said unipolar pulses.

6. The switch and memory device as set forth in claim 5 wherein said GaN is sputtered GaN of high resistivity.

7. The switch and memory device as set forth in claim 5 wherein said GaN has a thickness in the range 500 angstroms to 10,000 angstroms.

8. The switch and memory device as set forth in claim 6 wherein said means to apply energy includes an injecting contact to said region of GaN made from In or In alloys.

9. A non-volatile memory, comprising:
a first region of relatively low resistivity silicon;
a second region of GaN forming a junction with said first region, said second region of GaN containing a high density of material imperfections including deep energy traps existing at densities greater than $10^{18}$ $cm^{-3}$ with said traps including double or more acceptor-like traps in the bulk of said GaN and donor-like traps in the vicinity of said junction so as to form a memory that exhibits a non-volatile high impedance state and a non-volatile low impedance state with both said high impedance state and said low impedance state being addressable in both a bipolar and unipolar mode; and
means to apply energy between said first and second regions, said means to apply energy including an injecting contact to said second region and unipolar voltage pulse means coupled to said injecting contact and said first region for switching said device from said high impedance state to said low impedance state and from said low impedance state to said high impedance state using said unipolar pulses.

10. The memory as set forth in claim 9 wherein said GaN is sputtered GaN of high resistivity.

11. The memory as set forth in claim 9 wherein said GaN has a thickness in the range 500 angstroms to 10,000 angstroms.

12. The memory as set forth in claim 10 wherein said injecting contact comprises In or In alloys.

13. A non-volatile bistable switch and memory device operable between first and second impedance states in both a bipolar and unipolar mode, comprising:
a crystalline silicon substrate;
a layer of GaN sputtered onto said silicon substrate so as to form a semi-insulating layer thereon and a junction therewith with said sputtered GaN acting to exhibit a high density of material imperfections including deep energy traps existing at densities greater than approximately $10^{18}$ $cm^{-3}$ with said traps including double or more acceptor-like traps in the bulk of said GaN and donor-like traps in the vicinity of said junction so as to establish said bistable switch;
means to make contact to said substrate and layer of GaN; and
voltage pulse means coupled to said means to make contact for switching said device between said first and second impedance states, said voltage pulse means including unipolar voltage pulse means for switching said device from said first impedance to said second impedance state and from said second impedance state to said first impedance state using said unipolar pulses.

14. The device as set forth in claim 13 wherein the resistivity of said layer of GaN is in the range of $10^5$ to $10^{10}$ ohm/cm.

15. The device as set forth in claim 13 wherein said GaN has a thickness in the range 500 angstroms to 10,000 angstroms.

16. A non-volatile bistable switch and memory device exhibiting characteristics which allow switching between a pair of impedance states in both a bipolar and unipolar mode, comprising:

a first region of one conductivity type crystalline silicon;

a second region of relatively high resistivity crystalline GaN forming a junction with said first region and having a doping density to give a conductivity type, said second region of relatively high resistivity GaN containing a density of material imperfections including double or more acceptor-like deep energy traps greater than the said doping density thereof to give said conductivity type;

an injecting contact formed onto said second region; and means coupled to said injecting contact and to said first region for switching said device between said impedance states, said means coupled to said injecting contact and to said first region for switching said device between impedance states including means for applying unipolar voltage pulses to said device for reversibly switching said device between said pair of impedance states using said unipolar voltage pulses.

17. The device as set forth in claim 16 wherein the said density of material imperfections including deep energy traps is greater than approximately $3 \times 10^{18}$ $cm^{-3}$.

18. The device as set forth in claim 16 wherein said GaN has a thickness in the range 500 angstroms to 10,000 angstroms.

19. A non-volatile bistable switch and memory device switchable back and forth between a high impedance state and a low impedance state in both unipolar and bipolar modes, comprising:

a heterojunction including a first region of relatively low resistivity crystalline silicon heavily doped to provide one conductivity type and a second region including high resistivity crystalline GaN doped to provide a conductivity type, said GaN forming a junction with said silicon with the GaN of said second region and the interface thereat with said silicon having a high density of material imperfections including double or more acceptor-like deep energy traps within the bulk thereof existing at densities greater than approximately 3 $\times$ 10$^{18}$ $cm^{-3}$ such as to cause said device to exhibit the said high and low impedance states; and means coupled to said device for switching said device between the said impedance states, said means coupled to said device for switching said device between said impedance states including means for applying unipolar voltage pulses to said device for reversibly switching said device back and forth between said high impedance state and said low impedance state using said unipolar voltage pulses.

20. A semiconductor bistable impedance and memory element including a first region of crystalline silicon of one conductivity type and a second region of semi-insulating crystalline GaN of a resistivity between $10^5$ and $10^{10}$ ohm/cm and of a conductivity type, said second region forming a heterojunction with said silicon and containing a high density of material imperfections including deep energy level traps existing at densities greater than $3 \times 10^{18}$ $cm^{-3}$, said traps acting when full to effect a high impedance state in said element and when empty to effect a low impedance state in said element, and means coupled to said element for applying unipolar voltage pulses to said element to switch said element from said high impedance state to said low impedance state and from said low impedance state to said high impedance state using said unipolar voltage pulses.

21. The element as set forth in claim 20 wherein said semi-insulating GaN is RF sputtered GaN.

22. The element as set forth in claim 21 wherein said first region of silicon is doped to a density of $10^{18}$ impurity atoms $cm^{-3}$ or greater to give said one conductivity type.

23. The element as set forth in claim 22 wherein said traps include double or more acceptor-like traps in the bulk of said GaN and donor-like traps in the vicinity of said heterojunction.

* * * * *